Oct. 18, 1932.   W. J. DENNIS   1,883,609
GASKET
Filed May 31, 1930
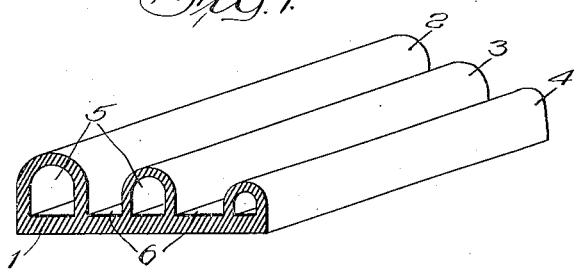
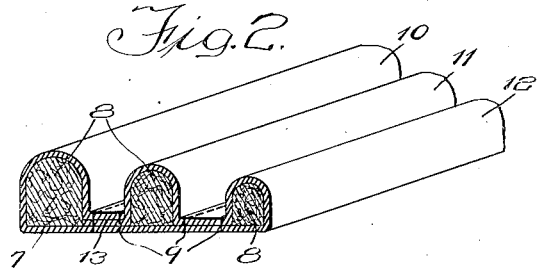
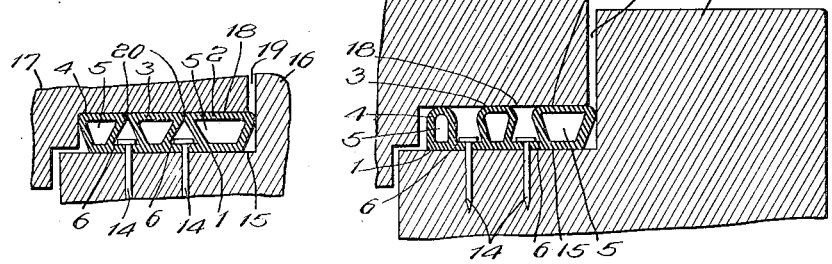
Inventor:
William J. Dennis Patented Oct. 18, 1932

1,883,609

UNITED STATES PATENT OFFICE

WILLIAM J. DENNIS, OF CHICAGO, ILLINOIS

GASKET

Application filed May 31, 1930. Serial No. 458,157.

This invention relates generally to articles known as gaskets, draft excluding elements, door cushions and the like, and has to do particularly with a gasket adapted to be positioned between a refrigerator door casing and refrigerator door to thereby serve as a sealing agent.

The principal object of the invention is to provide a strip of moisture-proof yieldable or resilient material having substantially a flat base and formed with a number of spaced longitudinal bead portions of unequal cross-section extending therefrom so that the beads may be adapted for successive stages of wear according to their respective size.

Another object of the invention is to provide a gasket as above described wherein the area between the longitudinal bead portions provide flat nailing portions.

A further object of the invention is to construct the gasket whereby the adjacent bead portions may contact providing the gasket is sufficiently compressed.

In the drawing wherein the constructional features of the present invention are illustrated:

Fig. 1 is an oblique projection showing the preferred method of constructing the gasket;

Fig. 2 is a modified form of construction wherein the gasket comprises a relatively wide strip of fabric material which is folded over to inclose a stuffing or packing insert and thence stitched to thereby provide a number of longitudinal bead portions of unequal cross-section.

Fig. 3 is a view showing part of a refrigerator door casing, and door in section, with the gasket as shown in Fig. 1, associated between them to show the manner in which the gasket is adapted for successive stages of wear; and Fig. 4 is a sectional view showing the shape the gasket will assume after it has lost its resiliency.

With reference to the drawing and particularly to Fig. 1, the gasket is shown to comprise a substantially flat base portion 1 with a number of longitudinal bead portions 2, 3, and 4, which may be of various widths and heights. These bead portions are preferably constructed so that the same are tubular, as indicated at 5. It will be evident that each bead is provided with upstanding wall portions which assist in making each bead more rigid and therefore, susceptible for longer wear. The area between the several beads is constructed to be of sufficient width and flatness to provide nailing channel portions 6. The beads are also constructed of such graduated sizes that their tops or upper extremities are adapted to lie substantially in an inclined plane with reference to the base of the gasket. Obviously, the gasket is preferably made of rubber or some other suitable resilient material.

In the modified construction illustrated in Fig. 2, it will be evident that the gasket may be constructed to include a relatively wide strip of water-proof fabric, and a stuffing or packing insert. In this construction the gasket is formed with a substantially flat base 7 and rolled over to inclose a packing or stuffing insert 8, and thence secured to the base portion 7 by double rows of stitching 9 to thereby provide a number of spaced longitudinal bead portions 10, 11 and 12 of unequal cross-section. As shown at 13, the edges of the material of which the gasket is formed are folded one upon the other to form three thicknesses and is thence stitched. Obviously, the area between these bead portions also provides nailing channel portions similar to the previously described construction illustrated in Fig. 1. The essential points in the construction of this gasket member are substantially similar to the previously described structure, and therefore it is not considered necessary to resort to further details.

In Fig. 3 the gasket illustrated in Fig. 1, is shown secured by small brads 14 within the rebate or rabbet 15 formed in the refrigerator door casing 16. It will thus be apparent that when the refrigerator door 17 is closed, the rabbeted face portion 18 of the same will contact the several bead portions 2, 3, and 4, to thereby compress them and seal the space 19 between the casing and door, as clearly shown, with each bead adapted to be successively worn. If desired, the gasket may be positioned in a manner whereby all the beads will simultaneously contact the door. Obviously the gasket may be mounted on the door instead of on the casing.

It will be evident from the disclosure in Fig. 4 that after a time, the gasket on becoming worn will practically assume contorted shape whereby the beads may contact each other as indicated at 20.

From the aforesaid detailed description, it will be clear that a very unique gasket member is provided which may either be arranged in a manner whereby all the beads are adapted to be simultaneously worn or adapted for successive stages of wear.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A weather seal made solely from an integral strip of resilient material, and consisting of a base portion with a plurality of spaced tubular longitudinal portions of graduated sizes extending from one side thereof, the material forming the side walls of said longitudinal portions being substantially perpendicular to said base portion.

2. A weather seal consisting of a substantially flat base portion made of flexible weatherproof material, a plurality of longitudinal tubular portions of graduated sizes integrally connected with one side of said base, the tops of said longitudinal portions being rounded, and the walls thereof being substantially perpendicular to said base, and compressible inserts arranged in said longitudinal portions.

3. A weather seal made solely from an integral strip of resilient material, and consisting of a base portion with a plurality of spaced tubular portions of graduated sizes extending from one side thereof for engagement with an object, the material forming the sides of said longitudinal portions being substantially perpendicular to said base portion, and the material between the adjacent longitudinal portions providing channels through which means may extend for securing the seal to a support.

In witness whereof, I hereunto subscribe my name this 28th day of May A. D., 1930.

WILLIAM J. DENNIS.